United States Patent
Kim et al.

(10) Patent No.: US 10,146,197 B2
(45) Date of Patent: Dec. 4, 2018

(54) METHOD FOR CREATING PROTOTYPE AND APPARATUS THEREFOR

(71) Applicant: STUDIO XID KOREA, INC., Seoul (KR)

(72) Inventors: Soo Kim, Hwaseong-si (KR); Jae Won Song, Seoul (KR)

(73) Assignee: STUDIO XID KOREA, INC., Seoul (KR)

( * ) Notice: Subject to any disclaimer, the term of this patent is extended or adjusted under 35 U.S.C. 154(b) by 60 days.

(21) Appl. No.: 15/380,969

(22) Filed: Dec. 15, 2016

(65) Prior Publication Data

US 2017/0300020 A1 Oct. 19, 2017

(30) Foreign Application Priority Data

Apr. 15, 2016 (KR) ........................ 10-2016-0046478

(51) Int. Cl.
*G05B 15/02* (2006.01)
*G06F 17/50* (2006.01)
(Continued)

(52) U.S. Cl.
CPC ......... *G05B 15/02* (2013.01); *G06F 17/5009* (2013.01); *G06F 3/04847* (2013.01);
(Continued)

(58) Field of Classification Search
CPC ............. G06F 11/3457; G06F 17/5009; G06F 3/04847; G06F 3/04883; G06F 2217/04; G06F 2217/14; G05B 15/02
(Continued)

(56) References Cited

U.S. PATENT DOCUMENTS

| 4,870,561 | A | * | 9/1989 | Love | ..................... | G06F 11/261 |
| | | | | | | 700/87 |
| 5,371,851 | A | * | 12/1994 | Pieper | ............ | G01R 31/318307 |
| | | | | | | 345/501 |

(Continued)

OTHER PUBLICATIONS

David, B., et al., SIGMA-CAD : Some New Concepts in Design of General Purpose CAD Systems, Proceedings of the 15th Design Automation Conference, 1978, pp. 321-325, [retrieved on Jul. 16, 2018], Retrieved from the Internet: <URL:http://dl.acm.org/>.*
(Continued)

*Primary Examiner* — Geoffrey R St Leger
(74) *Attorney, Agent, or Firm* — Studebaker & Brackett PC

(57) ABSTRACT

Disclosed are methods and apparatuses for creating a prototype. The methods include at least: receiving a generated prototype, sensing a trigger on the received prototype, generating a message comprising an identifier for identifying an external terminal according to the sensing of the trigger, determining, when a first message and a second message of a plurality of generated messages are generated sequentially before an expiry of a preset message transmission time, the second message representing a transmission message, providing to a bridge application matched to the identifier, the generated message, after the expiry of the preset message transmission time, generating a control command based on the generated message, using the bridge application, and transmitting the generated control command to the external terminal, wherein the control command includes a command for enabling the external terminal to output a preset response in response to the control command.

18 Claims, 10 Drawing Sheets

(51) Int. Cl.
*G06F 3/0488* (2013.01)
*G06F 3/0484* (2013.01)
(52) U.S. Cl.
CPC ...... *G06F 3/04883* (2013.01); *G06F 2217/04* (2013.01); *G06F 2217/14* (2013.01)
(58) Field of Classification Search
USPC ........................................................ 717/106
See application file for complete search history.

(56) References Cited

U.S. PATENT DOCUMENTS

| | | | | |
|---|---|---|---|---|
| 5,485,600 | A * | 1/1996 | Joseph | G06F 8/34 |
| | | | | 345/473 |
| 6,005,549 | A * | 12/1999 | Forest | G06F 3/011 |
| | | | | 345/157 |
| 7,490,032 | B1 * | 2/2009 | Koh | G06F 17/5009 |
| | | | | 703/22 |
| 7,613,599 | B2 * | 11/2009 | Bade | G06F 17/5022 |
| | | | | 703/14 |
| 7,937,665 | B1 * | 5/2011 | Vazquez | G05B 19/0426 |
| | | | | 715/763 |
| 2002/0186245 | A1 * | 12/2002 | Chandhoke | G05B 19/0426 |
| | | | | 715/764 |
| 2003/0078762 | A1 * | 4/2003 | Hashima | G06F 17/5009 |
| | | | | 703/13 |
| 2007/0240131 | A1 * | 10/2007 | Sumerlin, Jr. | G06F 8/20 |
| | | | | 717/139 |
| 2008/0109475 | A1 * | 5/2008 | Burmester | G06F 17/2785 |
| 2010/0115093 | A1 * | 5/2010 | Rice | H04W 4/70 |
| | | | | 709/224 |
| 2012/0198279 | A1 | 8/2012 | Schroeder | |
| 2013/0067497 | A1 * | 3/2013 | Seo | G06F 1/1694 |
| | | | | 719/318 |
| 2016/0118790 | A1 * | 4/2016 | Imhof | G05B 15/02 |
| | | | | 700/275 |
| 2017/0090442 | A1 * | 3/2017 | Chien | G05B 15/02 |
| 2017/0264485 | A1 * | 9/2017 | Papleux | H04L 67/12 |

OTHER PUBLICATIONS

Spina, G., et al., CRNTC+: A smartphone-based sensor processing framework for prototyping personal healthcare applications, 7th International Conf. on Pervasive Computing Tech. for Healthcare and Workshops, 2013, pp. 252-255, [retrieved on Jul. 16, 2018], Retrieved from the Internet: <URL:http://ieeexplore.ieee.org/>.*
Song, "Two-way REST Adaptor for Data/Event/Service Interoperation in the Internet of Things", Thesis, Feb. 2014, pp. 1-65, Department of Computer Engineering, Graduate School, Chungnam National University, Daejon, Korea.
Korean Office Action for corresponding Korean Patent Application No. 10-2016-0046478 dated May 19, 2016.

* cited by examiner

METHOD FOR CREATING PROTOTYPE AND APPARATUS THEREFOR

CROSS-REFERENCE TO RELATED APPLICATION

This application claims priority from Korean Patent Application No. 10-2016-0046478 filed on Apr. 15, 2016, in the Korean Intellectual Property Office, the disclosure of which is incorporated herein by reference in its entirety.

BACKGROUND

1. Technical Field

The present inventive concept relates to a method for creating a prototype and an apparatus therefor. More particularly, the present inventive concept relates to a method for creating a prototype of an application capable of linking a user terminal to an external terminal, and an apparatus therefor.

2. Description of the Related Art

An application for a terminal is used in controlling a specific function of the terminal or receiving a specific Internet service through the terminal.

When creating a prototype of the application, an actual input and consequential output state for the terminal cannot be checked, and an Internet service may also not actually be implemented in the terminal. The functions of the terminal, Internet service, and the like imitatively implemented using a prototyping tool may differ from functions of an actual terminal, Internet service, and the like. This may cause problems of a deterioration of a value as a prototype for actually experiencing the functions of the terminal, Internet service, and the like.

To avoid these problems, a program for an input and an output of an actual terminal can be created without using a prototyping tool, but this is inappropriate for creating a prototype in terms of time and cost.

Nevertheless, there has not been proposed so far a method for creating a prototype using functions of an actual terminal, Internet service, and the like.

SUMMARY

An embodiment of the present disclosure provides a method for creating a prototype using an input and an output of an actual terminal, and an apparatus therefor.

Specifically, an embodiment of the present disclosure provides a method capable of minimizing programming for creating a prototype by using an actual terminal when functions of the actual terminal need to be used as an input or an output, and an apparatus therefor. Furthermore, an embodiment of the present inventive concept provides a method capable of improving utilization of existing prototyping creation tools by using prototyping tools when creating prototypes other than those for which an input or an output of an actual terminal is used, and an apparatus therefor.

Another embodiment of the present disclosure provides an apparatus and a method capable of maximizing user experience through a prototype by using an actual terminal.

However, embodiments of the present disclosure are not restricted to those set forth herein. The other embodiments of the present inventive concept which are not mentioned herein will become more apparent to one of ordinary skilled in the art to which the present inventive concept pertains by referencing the detailed description of the present inventive concept given below.

According to embodiments of the present disclosure, there is provided a method and an apparatus in which a user uses an actual terminal so as to create a prototype capable of minimizing programming.

According to embodiments of the present disclosure, an input and an output of an actual terminal are used so as to maximize user experience in executing a prototype. Thus, it is an advantage of the present inventive concept that a user may have an opportunity of experiencing and evaluating functions of an actual application only by creating a prototype.

That is, according to embodiments of the present disclosure, an output of an actual terminal may be checked by executing a prototype.

According to embodiments of the present disclosure, an effect of enabling a user to experience a prototype capable of controlling another terminal in interlock with an output of an actual terminal is provided.

According to embodiments of the present disclosure, an effect of enabling a user to experience a prototype capable of controlling a terminal in interlock with an actual Internet service is provided.

According to some embodiments of the present disclosure, a method for creating a prototype is provided, the method comprises receiving, by a prototyping terminal, inputs of setting a trigger of a prototype and a response of an external terminal according to the trigger, generating, by the prototyping terminal, a prototype based on the inputs of setting, receiving, by an execution terminal, the generated prototype, sensing, by the execution terminal, the trigger on the received prototype, generating, by the execution terminal, a control command corresponding to the sensed trigger according to the sensing of the trigger, and transmitting, by the execution terminal, the generated control command to the external terminal, wherein the control command comprises a command for enabling the external terminal to output a preset response in response to the control command.

According to some embodiments of the present disclosure, a method for creating a prototype is provided, the method comprises setting, in a prototyping terminal, a trigger input of an external terminal as a trigger of a prototype, setting, in the prototyping terminal, a response of an execution terminal according to the trigger, generating, by the prototyping terminal, a prototype based on the setting of the trigger and the response, receiving, by the execution terminal, the generated prototype, receiving, by the execution terminal, a trigger input from the external terminal, sensing, by the execution terminal, the trigger based on the received trigger input, and outputting, by the execution terminal, a preset response when the trigger is sensed.

According to some embodiments of the present disclosure, a method for creating a prototype is provided, the method comprises setting, in a prototyping terminal, a trigger input of a first external terminal as a trigger of a prototype, setting, in the prototyping terminal, a response of a second external terminal according to the trigger, generating, by the prototyping terminal, a prototype based on the setting of trigger and the response, receiving, by the execution terminal, the generated prototype, receiving, by the execution terminal, a trigger input from the first external terminal, sensing, by the execution terminal, the trigger based on the received trigger input, according to the sensing of the trigger, generating, by the execution terminal, a control command corresponding to the sensed trigger, and transmitting, by the execution terminal, the generated control command to the second external terminal, wherein the control command comprises a command for enabling the second external terminal to output a preset response in response to the control command.

According to some embodiments of the present disclosure, a method for creating a prototype is provided, the method comprises generating, by a prototyping terminal, a prototype when a prototype creation input of a user is received, receiving, by an execution terminal, the generated prototype, sensing, by the execution terminal, a trigger on the received prototype, when a virtual trigger input is received from the prototyping terminal, generating, by the execution terminal, a control command corresponding to the sensed trigger, when the trigger is sensed, and outputting, the execution terminal, a preset response in response to the generated control command.

According to some embodiments of the present disclosure, a prototype execution terminal is provided, the a prototype execution terminal comprises one or more processors, a memory which loads a computer program executed by the processors, and a storage which stores the computer program, a prototype received from a prototyping terminal, and a bridge application, wherein the computer program comprises an operation for sensing a trigger of the prototype, an operation for generating a control command corresponding to the sensed trigger when the trigger is sensed, and an operation for transmitting the control command to an external terminal pre-matched to the bridge application, wherein the control command include a command for enabling the external terminal to output a preset response.

According to some embodiments of the present disclosure, a prototype execution terminal is provided, the a prototype execution terminal comprises one or more processors, a memory which loads a computer program executed by the processors, a storage which stores the computer program, a prototype received from a prototyping terminal, and a bridge application, and a display which displays an object, wherein the computer program comprises an operation of receiving a trigger input from an external terminal, an operation of sensing a trigger of the prototype by using the bridge application pre-matched to the external terminal on the basis of the trigger input, an operation of generating a control command corresponding to the sensed trigger, when the trigger is sensed, and an operation of changing a display state of the object according to the control command.

DETAILED DESCRIPTION OF THE EMBODIMENTS

Figure 1:
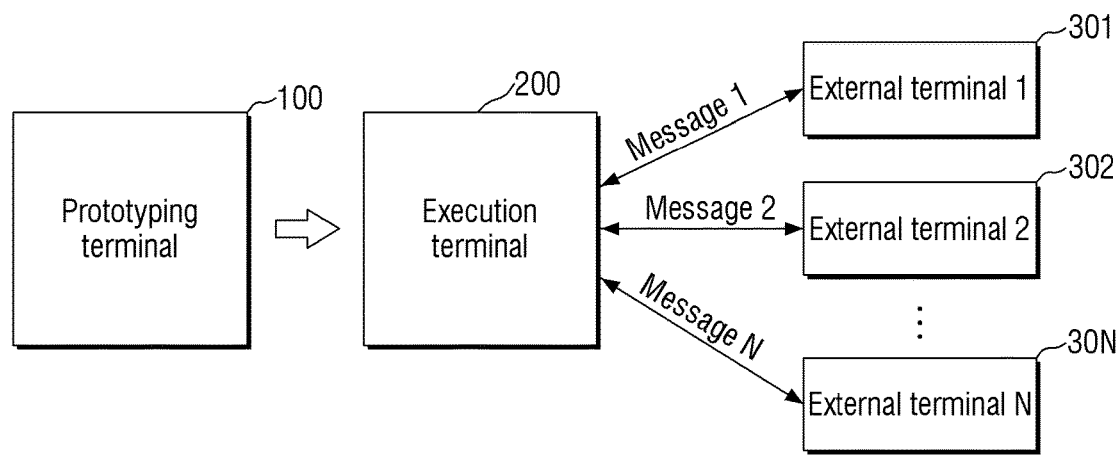
FIG. 1 illustrates a configuration of a prototype creation system according to an embodiment of the present inventive concept.

Advantages and features of the present disclosure and methods of accomplishing the same is understood more readily by reference to the following detailed description of exemplary embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the present disclosure to those skilled in the art, and the present disclosure will only be defined by the appended claims. Like reference numerals refer to like components throughout the specification.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "made of," when used in this specification, specify the presence of stated components, steps, operations, and/or elements, but do not preclude the presence or addition of one or more other components, steps, operations, elements, and/or groups thereof.

As used herein, the term "prototyping terminal" as used herein may mean a terminal which creates a prototype, and the term "execution terminal" may mean a terminal which executes the created prototype.

The term "external terminal" as used herein may mean a certain device which cannot be directly controlled by an execution terminal. An external terminal may be an Internet of Things device capable of communicating with an execution terminal through a network. For example, the external terminal may be a device such as a lamp, a car, a thermometer in a building, and a boiler controlled through network communication with an execution terminal. Furthermore, the external terminal may also include devices providing a specific Internet service.

The term "bridge application" as used herein may mean an application which performs a function of transmitting an input of an external terminal received from the external terminal to an execution terminal. Furthermore, the bridge application may perform a function of receiving a message from the execution terminal and transmitting a control signal that can be identified by the external terminal. For example, if the external terminal is a lamp, the bridge application may receive, as an input, a lamp on/off state change, and transmit a specific message to the execution terminal. Furthermore, in the above-mentioned example, when a specific input is applied to the execution terminal, the bridge application may identify the specific input as a message for changing an on/off state of the lamp, and transmit a signal for changing an on/off state of the lamp to the lamp.

The term "trigger" as used herein may mean a condition under which an external terminal or an execution terminal outputs a specific response. For example, the trigger may include a touch input inputted by an execution terminal, information received by an external terminal through a sensor and the like, information on a specific state of an external terminal, and the like. Furthermore, the term "response" as used herein may mean all types of outputs outputted by an external terminal or an execution terminal upon occurrence of a trigger. For example, the response may include a change of an object on a display of the execution terminal, a sound output, and a vibration. Furthermore, the response may include all types of outputs outputted by an external terminal. In the above-mentioned example, when the external terminal is a lamp, an on/off state of the lamp may also be a response.

The term "trigger" as used herein may mean a change in a reference attribute value of another object for changing a reference attribute value of one object. For example, when object A moves to change a reference attribute value of object A, a reference attribute value of object B changes, and when object B moves, the change in the reference attribute value of object A may be a trigger for causing the reference attribute value of object B to change. The trigger may have a trigger range.

FIG. 1 illustrates a configuration of a prototype creation system according to an embodiment of the present inventive concept.

The configuration and operation of the prototype creation system will now be described in detail.

For convenience of description, the prototype creation system will be referred to as a system. Referring to FIG. 1, the system may include a prototyping terminal 100 and an execution terminal 200. The prototype creation system may include a plurality of external terminals 301, 302, . . . , 30N.

In this case, the prototyping terminal 100 and the execution terminal 200 may be computing devices which can be interconnected through a network. The prototyping terminal 100 and the execution terminal 200 may be any one among a server device, a fixed computing device such as a desktop PC, and a mobile computing device such as a notebook, a smart phone, and a table PC.

The external terminals 301, 302, 30N may be various types of devices which can communicate with the execution terminal 200.

The external terminals 301, 302, 30N may communicated with the execution terminal 200 in various ways depending on the type and location of the external terminals 301, 302, . . . , 30N. For example, the execution terminal 200 and the external terminal 301 may perform near field communication therebetween, and the execution terminal 200 and the external terminal 302 may perform Internet communication therebetween.

According to one embodiment of the present inventive concept, the prototyping terminal 100 may be a computing device for executing a prototype creation method according to one embodiment of the present inventive concept.

In this case, the prototyping terminal 100 may store therein a prototyping tool for executing the prototype creation method. The prototyping tool may generate a prototype when a prototype creation input is received from a user of the prototyping terminal 100 through the prototyping terminal 100. That is, the prototyping tool may be a creating tool for supporting a prototype creation activity of the user. The prototyping terminal 100 may distribute the prototype to the execution terminal 200 when the prototype is generated.

Furthermore, according to another embodiment of the present inventive concept, the prototyping terminal 100 may upload the generated prototype to a server which the execution terminal 200 connects to download the prototype. That is, the execution terminal 200 downloads the prototype from the server, thereby distributing the generated prototype.

In the process of prototype creation, the prototyping terminal 100 may provide a prototyping tool to the user of the prototyping terminal 100.

The prototyping tool may provide the user with an interface capable of adding a rule for transmission of a specific message to a prototype. The user may add the rule for transmission of a specific message to a prototyping tool through the interface. Furthermore, the user may input an identifier for the specific message and input various setups relating to the message described below through the interface.

The specific message may be designed to enable at least one of the external terminals 301, 302, 30N to generate a specific response, and may be transmitted from the execution terminal 200 to a bridge application. The bridge application may be pre-stored in the execution terminal 200. The bridge application may transmit the message to at least one of the external terminals 301, 302, 30N.

The message may include an identifier for identification thereof. For example, the identifier may include identification information for designating whether the bridge application which may receive a message is bridge application 1 matched to the external terminal 301 or bridge application 2 matched to the external terminal 302. Furthermore, the identifier may include identification information for designating whether the response generated from the external terminal 301 is effect A or effect B.

Furthermore, the message may include a numerical value indicating the level of a specific response generated from at least one of the external terminals 301, 302, 30N. For example, when the external terminal is a lamp, a message including a numerical value of 30 may be transmitted to the bridge application matched to the lamp. In this case, the bridge application may receive the message and convert the message into a control command, and the execution terminal 200 may transmit the control command to the lamp. Thus, the lamp may emit light at the luminous intensity corresponding to the numerical value of 30.

In another embodiment of the present inventive concept, a prototyping tool may provide the prototyping terminal 100 with an interface capable of adding a rule for reception of a specific message to a prototype. In this case, the message reception may occur in the execution terminal 200. The bridge application which is pre-stored in the execution terminal 200 may receive a trigger input from an external terminal, and generate a message on the basis of the received trigger input. The generated message may be provided to prototype execution software of the execution terminal 200 from the bridge application.

The user may add the rule for reception of a specific message to a prototyping tool through the interface. Furthermore, the user may input an identifier for the specific message and input various setups relating to the message described below through the interface.

The specific message may be designed to enable the execution terminal 200 and at least one of the external terminals 301, 302, 30N to generate a specific response, and may be generated on the basis of the trigger input transmitted to the execution terminal 200 from at least one of the external terminals 301, 302, 30N. In this case, the trigger input may mean an input enabling the execution terminal 200 to sense a trigger on the prototype. The external terminal 301 which transmits the trigger input and the external terminal 302 which outputs the response may be different from each other.

To generate the message, the execution terminal 200 may pre-store the bridge application. The bridge application may generate the message on the basis of the trigger input transmitted from at least one of the external terminals 301, 302, 30N to the execution terminal 200. Furthermore, the bridge application may provide the generated message to the prototype execution software of the execution terminal 200.

The message may include an identifier for identification thereof. For example, the identifier may include identification information indicating whether a transmitter of the trigger input serving as a basis of the message generation is the external terminal 301 or the external terminal 302. Furthermore, the identifier may include identification information indicating whether the response generated from the execution terminal 200 and at least one of the external terminals 301, 302, 30N is effect a or effect b.

Furthermore, the message may include a numerical value which functions as a trigger in the execution terminal 200. In this case, the trigger input serving as a basis of the message generation may include the numeral value. For example, in case where an external terminal is a server which provides stock price information of a stock market, when a message including a numerical value of 1000 which is a stock price of a specific item is provided, the execution terminal 200 may identify a response execution value corresponding to the numerical value of 1000, and output a response according to the execution value.

An embodiment related to an output of a response when the execution terminal 200 executes the prototype.

The execution terminal 200 may receive the prototype generated by the prototyping terminal 100, and execute the received prototype. The execution terminal 200 may identify a user input or a message received through a bridge application. Furthermore, the execution terminal 200 may sense a trigger on the basis of the received user input or the message.

When the execution terminal 200 senses a trigger on the basis of the received user input or the message, the execution terminal 200 may generate a control command corresponding to the sensed trigger.

According to one embodiment of the present disclosure, the execution terminal 200 may sense a user input as a trigger.

The execution terminal 200 may receive the control command generated in the at least one external device so as to generate a response output of at least one of the external terminals 301, 302, 30N. The external terminal which has received the control command among the external terminals 301, 302, 30N may output a response according to the received control command. In this case, the response may be an output which is preset in correspondence to the received control command.

For the above-described embodiment, the execution terminal 200 may pre-store therein a bridge application.

The bridge application may receive, from the execution terminal 200, a message including an identifier of an external terminal which takes a role as a receiver. For example, the bridge application may be pre-matched to the identifier. That is, the message including a specific identifier may be transmitted to the specific bridge which is pre-matched to the specific identifier. The bridge application may translate the received message and generate a control command to be transmitted to the pre-matched external terminal 301. Thus, the execution terminal 200 may transmit the control command to the external terminal 301 by using the bridge application.

To this end, the bridge application may be stored after being matched with information on a transmitter or an external terminal which takes a role as a receiver. The bridge application may be matched only to one external terminal. That is, bridge application 1 may be matched to the external terminal 301, and bridge application 2 may be matched to the external terminal 302. However, embodiments of the present inventive concept are not limited thereto, and one bridge application may be involved with a message transmission/reception related to a plurality of external terminals 301 and 302.

According to another embodiment of the present inventive concept, the execution terminal 200 may sense a trigger of a prototype by identifying a trigger input received from an external terminal.

Specifically, the execution terminal 200 may receive a trigger input from at least one of the external terminals 301, 302, 30N. Furthermore, the execution terminal 200 may sense a trigger of a prototype on the basis of the received trigger input. Thus, the execution terminal 200 may generate a control command corresponding to the sensed trigger, and output a preset response through an output unit of the execution terminal 200 according to the control command.

For the above-described embodiment, the execution terminal 200 may pre-store therein a bridge application.

A bridge application may receive, from one external terminal, a trigger input related to the one external terminal serving as a transmitter. For example, bridge application 1 may be set to receive a trigger input of the pre-matched external terminal 301. In this case, the bridge application may generate a message to be provided to the execution terminal 200. In this case, the bridge application may generate a message including an identifier capable of identifying the external terminal 301.

The execution terminal 200 may receive the message generated by the bridge application, and sense a trigger in the message. In this case, the execution terminal 200 may identify the external terminal 301 which transmits the trigger input. Furthermore, the execution terminal 200 may analyze the message so as to sense a trigger of the prototype.

According to another embodiment of the present inventive concept, the execution terminal 200 may sense a trigger of the prototype on the basis of the trigger input received from the external terminal 301, and generate a control command for controlling another external terminal 302. The execution terminal 200 may transmit the generated control command to the external terminal 302. The external terminal 302 may receive the control command and output a preset response.

For the above-described embodiment, the execution terminal 200 may pre-store therein a bridge application.

Similarly to the embodiment described above, the bridge application may generate a message including an identifier for identifying the external terminal 301 which is a transmitter. The bridge application may be bridge application 1 which is pre-matched to the external terminal 301.

The message may be provided to the execution terminal 200, and the execution terminal 200 may sense a trigger in the message. As the trigger is sensed, the execution terminal 200 may generate a control command for outputting a specific response from the external terminal 302. Specifically, the execution terminal 200 may generate a message including an identifier for identifying the external terminal 302, and transmit the generated message to bridge application 2 matched to the external terminal 302. The bridge application 2 may translate the message so as to generate a control command to be transmitted to the identified external terminal 302. Thus, the execution terminal 200 may transmit the control command to the external terminal 302 by using the bridge application.

The system may further include other components required for implementation of embodiments of the present inventive concept.

Figure 2:
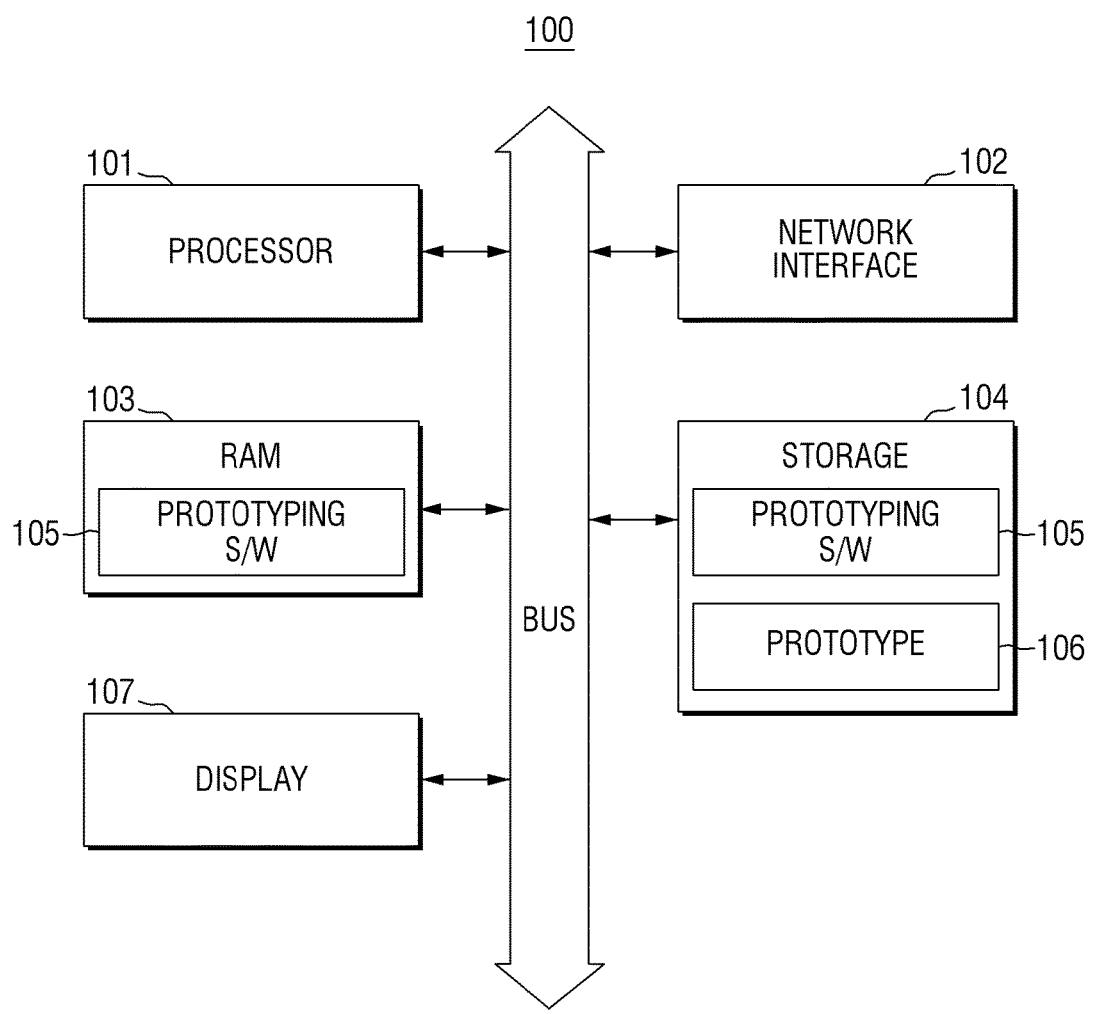
FIG. 2 is a block diagram illustrating a prototyping terminal according to another embodiment of the present inventive concept.

The prototyping terminal 100 will now be described in detail with reference to FIG. 2. FIG. 2 is a block diagram illustrating the prototype prototyping terminal 100 according to another embodiment of the present inventive concept.

Referring to FIG. 2, the prototyping terminal 100 may include a processor 101, a network interface 102, a memory 103, storage 104, and a display 107.

The processor 101 may control an overall operation of each component of the prototyping terminal 100. The processor 101 may include a central processing unit (CPU), a micro processor unit (MPU), a micro controller unit (MCU), or a certain type of processor well known in the technical field of the present inventive concept. Furthermore, the processor 101 may perform an arithmetic operation for at least one application or program for executing methods according to embodiments of the present inventive concept. The prototyping terminal 100 may include one or more processors.

The network interface 102 may support wired/wireless Internet communication of the prototyping terminal 100. Furthermore, the network interface 102 may support various communication methods other than Internet communication. To this end, the network interface 102 may include various communication modules.

The network interface 102 may transmit a prototype created by the prototyping terminal 100 to the execution terminal 200.

Figure 3:
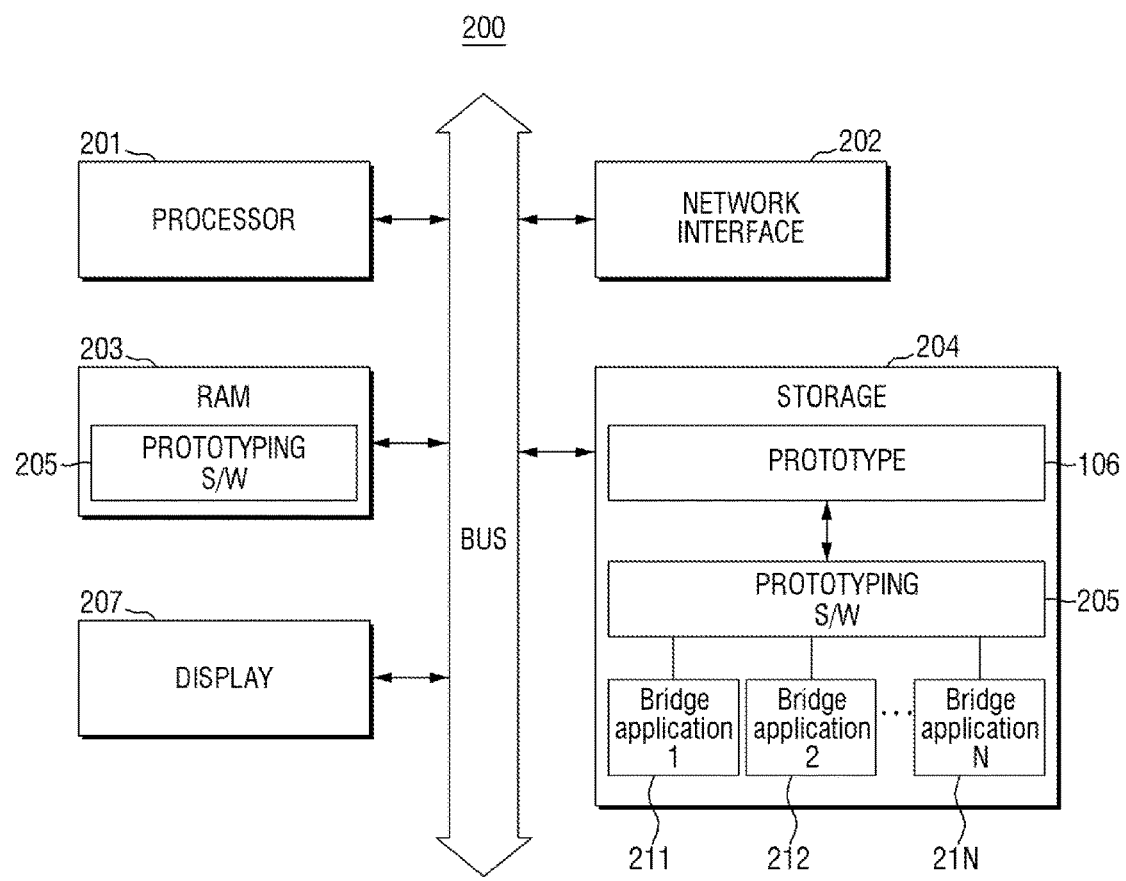
FIG. 3 is a block diagram illustrating a prototype execution terminal according to still another embodiment of the present inventive concept.

According to another embodiment of the present inventive concept, the network interface 102 may provide the execution terminal 200 with a connection for executing a prototype in the execution terminal 200, and in this case, the execution terminal 200 may be connected to the prototyping terminal 100 so as to execute a generated prototype. The memory 103 may store therein various data, commands, and/or information. The memory 103 may load one or more programs 105 from the storage 104 so as to perform the prototype creation method according to embodiments of the present inventive concept. FIG. 3 illustrates RAM as an example of the memory 103.

The storage 104 may non-temporarily store data and the like received from the external device 300. The storage 104 include a non-volatile memory such as a read only memory (ROM), an erasable programmable ROM (EPROM), an electrically erasable programmable ROM (EEPROM), and a flash memory, a hard disk, a removable disk, or a computer-readable recording medium of a certain type widely known in the technical field to which the present inventive concept belongs.

The storage 104 may store therein one or more programs 105 for performing the methods according to embodiments of the present inventive concept. FIG. 2 illustrates prototype creation software as an example of the program 105. The prototype creation software may provide a prototyping tool to a user of the prototyping terminal 100.

The storage 104 may store therein input matters and various setup matters for creating a prototype received from the execution terminal 200 or input from a user of the prototyping terminal 100. Furthermore, the storage 104 may store therein a generated prototype 106.

The display 107 may display various data, commands, and/or information of the prototyping terminal 100. Specifically, the display 107 may be formed as a touch screen having a touch sensor. The display 107 may display a prototyping tool when a prototype creation program is executed in the prototyping terminal 100.

Although not shown in the drawings, the prototyping terminal 100 may include an input unit for receiving a prototype creation input from a user by using the prototyping tool.

A configuration and operation of the execution terminal 200 will now be described with reference to FIG. 3. The description duplicated with the configuration of the prototyping terminal 100 will be omitted.

FIG. 3 is a block diagram illustrating the prototype execution terminal 200 according to still another embodiment of the present inventive concept. Referring to FIG. 3, the execution terminal 200 may include a processor 201, a network interface 202, a memory 203, storage 204, and a display 207. Furthermore, although not shown in the drawings, the prototyping terminal 100 may include an input unit for receiving various inputs from the user of the prototyping terminal 100.

The storage 204 may store therein one or more programs 205 for performing the methods according to embodiments of the present inventive concept. FIG. 3 illustrates prototype execution software as an example of the program 205. The prototype execution software may generate and provide various interfaces for executing the prototype generated by the prototyping terminal 100.

The storage 204 may store therein input matters and various setup matters for creating a prototype received from the execution terminal 200 or input from a user of the prototyping terminal 100. Furthermore, the storage 204 may store therein the prototype 106 generated by the prototyping terminal 100 and one or more bridge applications 211, 212, 21N.

The storage 204 may store therein bridge applications corresponding to the number of external terminals included in the prototype creation system.

The bridge applications 211, 212, 21N may be matched respectively to the external terminals 301, 302, 30N. The bridge applications may receive trigger inputs from the respective matched external terminals, and transmit a control command to the matched external terminals. The bridge applications may transmit a control command and/or receive trigger inputs according to the communication schemes supported by the respective external terminals by using various communication modules of the network interface 202.

The bridge applications may receive a message generated by the prototype execution software 205 and generate a control command. The operation of receiving the message and generating the control command may be understood as an operation of the bridge applications of receiving the message and translating the message into the control command. Furthermore, the bridge applications may generate a message on the basis of the trigger input received from an external terminal. The operation of receiving the trigger input and generating the message may be understood as an operation of the bridge applications of receiving the trigger input and translating the received trigger input into the message.

That is, when the execution terminal 200 and the external terminals 301, 302, 30N are different types of devices, the bridge applications may support signal transmission/reception between different types of devices. Furthermore, in another embodiment of the present inventive concept, the bridge applications may support signal transmission/reception between different types of external terminals 301 and 302. In this case, the execution terminal 200 may be used as a device for intermediating signals between the external terminals 301 and 302.

The display 207 may display various data, commands, and/or information of the prototyping terminal 100. Specifically, the display 207 may be formed as a touch screen having a touch sensor. The display 207 may display various interfaces provided by the prototype 106 when a prototype creation program is executed in the prototyping terminal 100. For example, the display 207 may display an object matched to the sensed trigger, or change the display state of the object.

Although not shown in the drawings, the execution terminal 200 may also include an input unit for receiving a user input for generating a trigger of the prototype 106. When the display 207 is provided with a touch sensor, the input unit may be integrated into the display 207.

An operation of each component of the execution terminal 200, including an operation of the bridge applications described above, may be implemented by executing the prototype execution software 205 by the processor 201.

The prototype execution software 205 according to one embodiment of the present inventive concept may include an operation of sensing a trigger of the prototype 106, an operation of generating a control command corresponding to the sensed trigger when the trigger is sensed, and an operation of transmitting the control command to an external terminal pre-matched to the bridge application, wherein the control command may include a command for enabling the external terminal to output a preset response.

Furthermore, the prototype execution software 205 according to another embodiment of the present inventive concept may include an operation of receiving a trigger input from an external terminal, an operation of sensing a trigger of the prototype by using the bridge application pre-matched to the external terminal on the basis of the trigger input, an operation of generating a control command corresponding to the sensed trigger when the trigger is sensed, and an operation of changing a display state of an object according to the control command.

Other embodiments of the present inventive concept will now be described in detail based on the descriptions of FIG. 1 to FIG. 3. The embodiments described below do not necessarily have to be performed separately, but may be performed in combination. Furthermore, it should be noted that the embodiments described below may be performed in combination with the embodiments of the present inventive concept described above with reference to FIG. 1 to FIG. 3.

Figure 4:
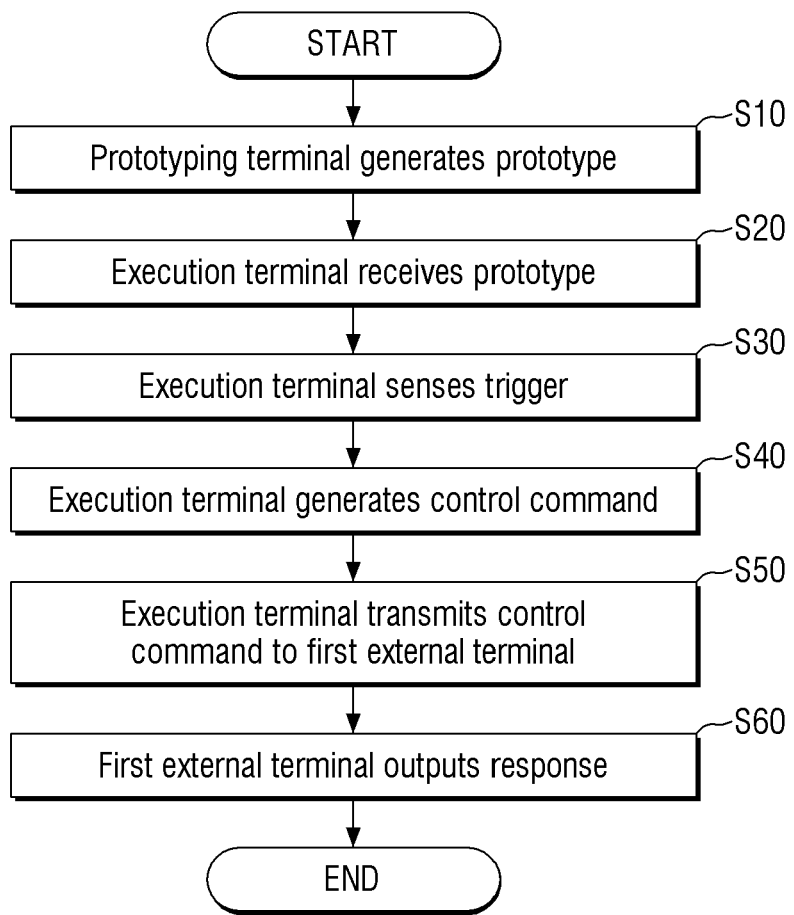
FIG. 4 is a flowchart illustrating a prototype creation method according to still another embodiment of the present inventive concept.

FIG. 4 is a flowchart illustrating a prototype creation method performed by a prototype creation system according to still another embodiment of the present inventive concept.

Referring to FIG. 4, the prototyping terminal 100 may receive, as an input, at least one of setups for trigger of a prototype and a response of an external terminal according to the trigger. Furthermore, the prototyping terminal 100 may generate a prototype on the basis of the input setups (S10).

Subsequently, the execution terminal 200 may receive a prototype generated by the prototyping terminal 100 (S20). In this case, the execution terminal 200 may receive directly from the prototyping terminal 100. Alternatively, the execution terminal 200 may receive, from a specific server, a prototype uploaded to the specific server by the prototyping terminal 100.

The execution terminal 200 may sense a trigger of the received prototype (S30). In step S30, the execution terminal 200 may receive, from a user of the execution terminal 200, a user input for the object on the display 207 of the execution terminal 200. The execution terminal 200 may sense the trigger of the received prototype in response to the received user input.

To this end, according to a first embodiment of the present inventive concept, in step S10, receiving the user input by the execution terminal 200 may be set as a trigger in the prototyping terminal 100.

According to a second embodiment of the present inventive concept, in step S10, the prototyping terminal 100 may receive, as an input, a reference attribute of an object. The reference attribute as used herein may mean a display attribute of the object for enabling the execution terminal 200 to sense the trigger in response to the user input. The display attribute may include display elements such as coordinates, size, color, and transparency of the object. An example in which the reference attribute of object A is x-axis coordinates of object A in a prototype will be described. In the prototype, it is assumed that object A is set to move along x-axis in response to the user input. When a drag input for the object on the display 207 is input through a user input in the execution terminal 200, object A may move along x-axis. In this case, since x-axis coordinates of object A change, the reference attribute of object A changes.

Furthermore, the prototyping terminal 100 may receive, as an input, a numerical value range including a start value and an end value of the reference attribute. In this case, changing the numerical value of the reference attribute within the numerical value range may be set as a trigger in the prototyping terminal 100.

In the example described above, when object A moves in the range of 0 to 200 on x-axis, the numerical value range may be input as 0 to 200 if the execution terminal 200 is capable of sensing the trigger. Furthermore, the trigger may be set such that object A moves in the range of 0 to 200 on x-axis.

When the trigger is sensed, the execution terminal 200 may generate a control command corresponding to the sensed trigger (S40).

In step S40, the execution terminal 200 may generate a message including an identifier for identifying an external terminal. The generated message may be provided to a bridge application matched to the identifier, among the bridge applications pre-stored in the execution terminal 200, and the execution terminal 200 may generate the control command on the basis of the message. Specifically, the bridge application matched to the identifier may receive the message and generate the control command.

Subsequently, the execution terminal 200 may transmit the generated control command to the external terminal (S50). The control command may include a command enabling a preset response according to the control command generated in the external terminal to be output.

To this end, according to the first embodiment, in step S10, outputting a preset response by the external terminal may be set as a response of the external terminal in the prototyping terminal 100.

Alternatively, according to the second embodiment, in step S10, when the numerical value changes by a user input, outputting the preset response from the external terminal on the basis of the change in the numerical value according to the generated control command may be set as a response of the external terminal in the prototyping terminal 100.

When the prototype creation system includes the external terminals 301, 302, 30N, at least one of the external terminals 301, 302, 30N may receive the control command transmitted in step S50, and output a preset response (S60).

Meanwhile, in step S30, the execution terminal 200 may determine whether a preset message transmission time has elapsed or not. Furthermore, in step S40, the execution terminal 200 may defer transmission of the control command until the preset message transmission time elapses, if the preset message transmission time has not elapsed.

This is to prevent the execution terminal 200 from transmitting too frequently a control command to the external terminal due to frequently generated triggers. When the external terminal receives consecutively multiple control commands, the external terminal may not properly process the control commands, causing an error in a response output. For example, when the preset message transmission time is 1 second, the execution terminal 200 may transmit generated messages only at an interval of 1 second. The transmission of the message before lapse of 1 second may be deferred.

In the example described above, it is assumed that message A and message B are generated in sequence within 1 second. In this case, the execution terminal 200 may defer transmission of message A and message B until 1 second elapses. Furthermore, when message A is generated first and deferred, the execution terminal 200 may delete message A if message B is generated afterwards before 1 second elapses. Since then, the execution terminal 200 may transmit message B to a bridge application when 1 second has elapsed. For example, when message A is a message for generating on response of a lamp and message B is a message for generating off response of the lamp, the execution terminal 200 may transmit, to the bridge application, only message B which is generated within 1 second before deferring the transmission. When the bridge application generates a control command on the basis of message B and transmits the control command to the lamp, the lamp may output an off state response.

Meanwhile, according to another embodiment of the present inventive concept, a method of enabling the prototyping terminal 100 to check the type of the message generated by the execution terminal 200 and transmitted to the bridge application is proposed. This is to check various types of messages and use the types of messages in the development of the prototype and bridge application.

To this end, the execution terminal 200 may generate a message, and transmit the generated message to the prototyping terminal 100. When the message transmitted from the execution terminal 200 is received, the prototyping terminal 100 may display the received message through the display 107 of the prototyping terminal 100. Furthermore, the prototyping terminal 100 may record the received message in the storage 104. In this case, the prototyping terminal 100 may record the received message for a predetermined time according to an input of the user of the prototyping terminal 100. For example, when the prototyping terminal 100 receives the message, the prototyping terminal 100 may start recording of the message by a user input requesting starting of recording, and end recording of the message by a user input requesting end of recording.

Furthermore, the prototyping terminal 100 may receive the message, and then, record only the message selected according to a selection input from the user among the received messages.

Figure 5:
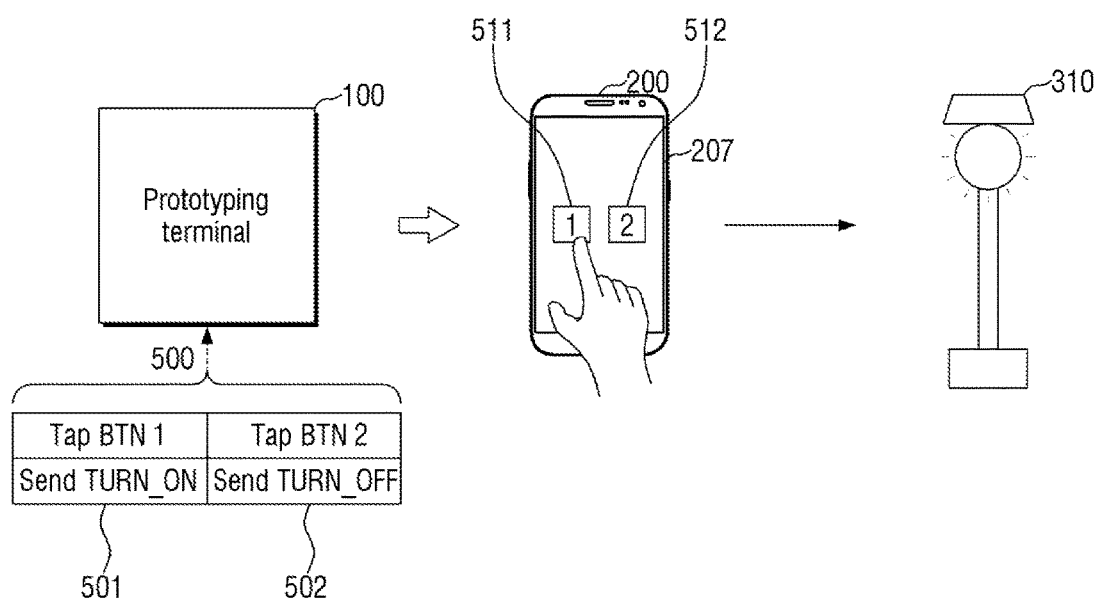
FIG. 5 illustrates an example of a prototype executed in an execution terminal and outputting a response of an external terminal, referred to by some embodiments of the present inventive concept.

FIG. 5 illustrates an example of a prototype executed in an execution terminal and outputting a response of an external terminal, referred to by some embodiments of the present inventive concept. FIG. 5 illustrates the example in which the external terminal is a lamp 310. The lamp 310 may include a communication unit for receiving a control command from the execution terminal 200, and a control unit for controlling an operation of a switch of the lamp 310 according to the received control command.

Referring to FIG. 5, the prototyping terminal 100 may generate a prototype 500 on the basis of various input matters for creation of a prototype inputted from the user of the prototyping terminal 100.

The prototype 500 may be set such that the trigger is generated when a touch gesture is received at the display 207 of the execution terminal 200 through a user input. Specifically, the prototype 500 may be divided into two functional areas according to the type of the trigger.

An area 501 may be set to receive a tap input at button 1 BTN1, as the trigger, and activate ("turn on") the state of the lamp 310 as a response.

An area 502 may be set to receive a tap input at button 2 BTN2, as the trigger, and deactivate ("turn off") the state of the lamp 310 as a response.

The execution terminal 200 may pre-store a bridge application for communication with the lamp 310. When the execution terminal 200 receives a tap input to button 1, the bridge application may transmit, to the lamp 310, an activation (turn on) control command for the lamp 310 set as a response.

Specifically, the trigger is sensed, and the execution terminal 200 may generate a message including an identifier of the lamp 310 by referring to the area 501 of the prototype 500. The execution terminal 200 may transmit the generated message to the bridge application pre-matched to the lamp 310 by referring to the identifier. The pre-matched bridge application may convert the generated message to generate a control command, and transmit the control command to the lamp 310. In this case, the transmission may be performed by using various communication methods such as a network communication method or a broadcasting method. However, the communication method may be based on a premise that the lamp 310 can communicate through the communication method.

On the contrary, when the execution terminal 200 receives a tap input to button 2, the bridge application may transmit, to the lamp 310, a deactivation (turn off) control command for the lamp 310 set as a response. In the same way as described above, the execution terminal 200 may generate a message including an identifier of the lamp 310 by referring to the area 502 of the prototype 500.

Likewise, the execution terminal 200 may transmit the generated message to the bridge application pre-matched to the lamp 310 by referring to the identifier. The pre-matched bridge application may convert the generated message to generate a control command, and transmit the control command to the lamp 310.

The lamp 310 may output a response according to the received control command. For example, the lamp 310 controls itself to a turn on state when the activation (turn on) control command is received, and controls itself to a turn off state when the deactivation (turn off) control command is received.

Figure 6:
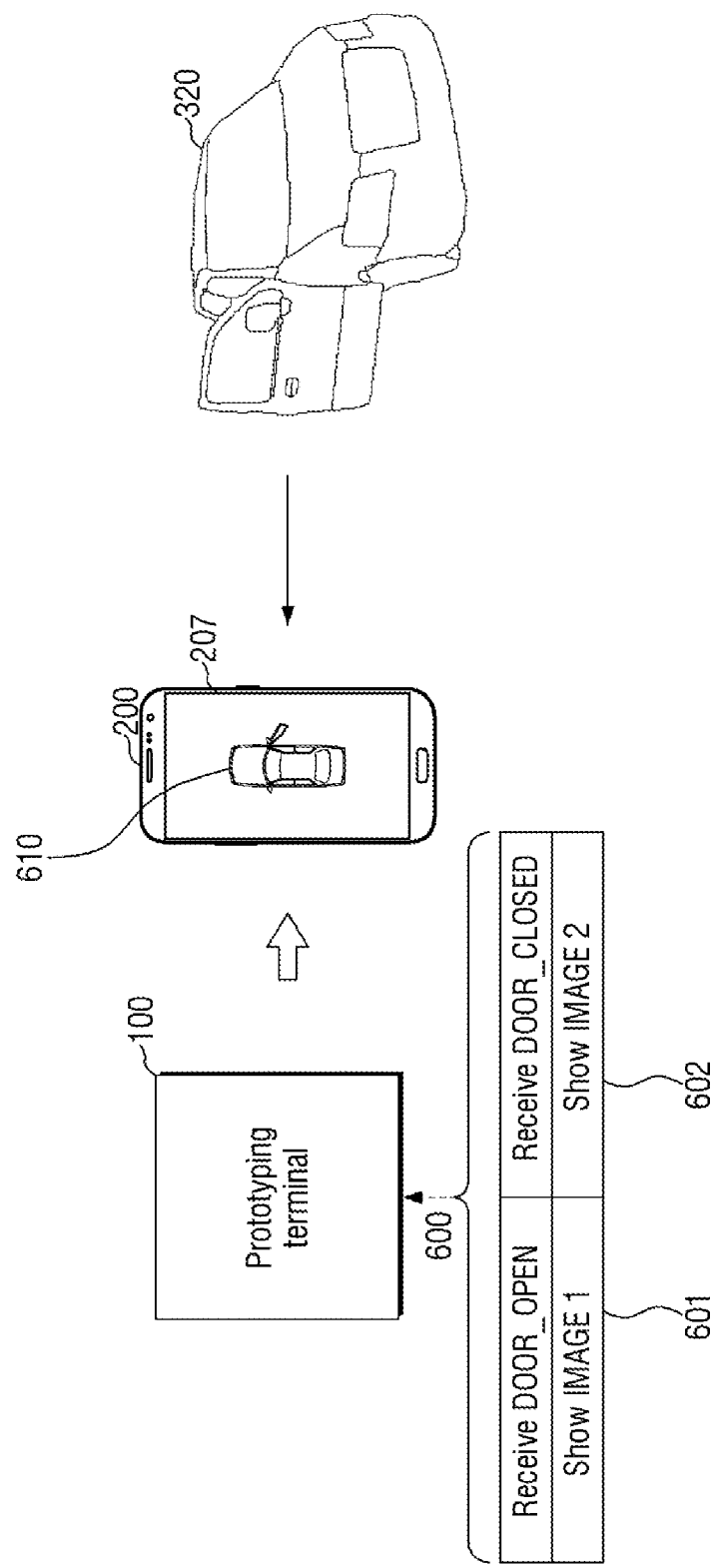
FIG. 6 illustrates an example of a prototype which outputs a response of an execution terminal when a trigger input is received from an external terminal, referred to by some embodiments of the present inventive concept.

FIG. 6 illustrates an example of a prototype which outputs a response of an execution terminal when a trigger input is received from an external terminal, referred to by some embodiments of the present inventive concept. FIG. 6 illustrates the example in which the external terminal is a car 320. An embodiment in which the execution terminal 200 receives a trigger input from the external terminal 320, unlike the embodiment described above with reference to FIG. 5, will be described with reference to FIG. 6.

Referring to FIG. 6, a trigger input of the external terminal 320 may be set as a trigger of a prototype in the prototyping terminal 100. For example, it is assumed that a prototype 600 is generated by the prototyping terminal 100.

The prototype 600 may be divided into two functional areas according to the type of the trigger. The prototype 600 may be divided into two areas 601 and 602 of a trigger of receiving a message DOOR_OPEN indicating opening of a door of the car 320 and a trigger of receiving a message DOOR_CLOSED indicating closing of the door of the car 320, respectively. The message reception may be performed when the execution terminal 200 receives the trigger input. Therefore, throughout the description, a reception of a trigger input by the execution terminal 200 should be understood as a concept including a reception of a message by the execution terminal 200.

Furthermore, a response of the execution terminal according to the set trigger may be set in the prototyping terminal 100.

That is, the execution terminal 200 may sense, as a trigger, receiving either of the two messages. Furthermore, the execution terminal 200 may output the set response when the trigger is sensed.

To this end, the execution terminal 200 may pre-store a bridge application for generating a message and providing the message to the execution terminal 200.

Specifically, in the example described above, the execution terminal 200 may pre-store a bridge application for communication with the car 320. The bridge application may be pre-matched to the car 320, and may receive a trigger input from the car 320. The trigger input may be, for example, state information generated when sensing opening or closing of the door of the car 320. To transmit the state information to the bridge application, the car 320 may include, as components, a communication unit and a state information generating unit.

The bridge application may generate a message including an identifier for identifying the car 320 when the trigger input is received. In this case, the bridge application may generate a message including state information of the car 320.

The bridge application may transmit the generated message to the prototype execution software 205 of the execution terminal 200.

A response of the execution terminal 200 according to trigger sensing may be set in the prototyping terminal 100 so as to generate the prototype 600. Specifically, in the example described above, displaying an object matched to the sensed trigger on the display of the execution terminal 200 according to the state information in the received message may be set as a response in the prototyping terminal 100.

That is, displaying an object 610 which is image 1 (IMAGE1) matched to door open state information of the car 320 may be set as a response in the prototyping terminal 100 when the execution terminal 200 receives the message DOOR_OPEN. Furthermore, displaying an object (not shown) which is image 2 (IMAGE2) matched to door closed state information of the car 320 may be set as a response in the prototyping terminal 100 when the execution terminal 200 receives the message DOOR_CLOSED.

The prototyping terminal 100 may generate the prototype 600 on the basis of the setups for trigger and the response. The execution terminal 200 may receive the generated prototype 600.

The execution terminal 200 may receive the above-described trigger input from the car 320, and sense the trigger on the basis of the received trigger input.

Specifically, as described above, the execution terminal 200 may receive the message generated when the trigger input is received by the bridge application, and sense the trigger.

As the trigger is sensed, the execution terminal 200 may output a preset response. FIG. 6 illustrates an example in which the execution terminal 200 receives the message DOOR_OPEN in the area 601 of the prototype 600, and senses the trigger.

As the trigger is sensed, the execution terminal 200 may display the object 610 indicating a door open state of the car 320.

Meanwhile, according to another embodiment of the present inventive concept, a method for enabling the prototyping terminal 100 to check the type of the message generated by a bridge application on the basis of the trigger input received by the execution terminal 200 may be proposed. This is to check various types of messages and use the types of messages in the development of the prototype and bridge application.

As described above with reference to FIG. 6, the execution terminal 200 may receive the trigger input from the external terminal, and generate the received trigger input into a message. Furthermore, as described above, specifically, the bridge application which has received the trigger input may generate a message.

In this case, the execution terminal 200 may transmit thus-generated message to the prototyping terminal 100. As the message transmitted from the execution terminal 200 is received, the prototyping terminal 100 may display the received message through the display 107 of the prototyping terminal 100. Furthermore, the prototyping terminal 100 may store the received message in the storage 104.

In this case, the prototyping terminal 100 may record the received message for a predetermined time according to an input of the user of the prototyping terminal 100. For example, when the prototyping terminal 100 receives the message, the prototyping terminal 100 may start recording of the message by a user input requesting starting of recording, and end recording of the message by a user input requesting end of recording.

Alternatively, the prototyping terminal 100 may record the received message for a preset time. In this case, the prototyping terminal 100 may receive an input for setting a recording time for the message received from a user, prior to recording the message.

Alternatively, the prototyping terminal 100 may receive the message, and then, record only the message selected according to a selection input from the user among the received messages.

The prototyping terminal 100 may transmit the recorded message to the execution terminal 200. In this case, as the recorded message is received, the execution terminal 200 may sense a trigger.

For example, in case where a trigger input is transmitted to the execution terminal 200 from an external terminal which tracks a movement of a person, the external terminal may be an image analyzing device.

The execution terminal 200 may receive an image signal on the movement of the person as a trigger input, and thus display, through the display 207, a graphical representation in which an avatar moves on a map.

To this end, receiving an image signal in which the person is identified may be set as a trigger in the prototyping terminal 100. Furthermore, an output of a graphical representation of the movement of the avatar on the map corresponding to the movement of the identified person may be set as a response.

The prototyping terminal 100 may generate a changed prototype in addition to the response of outputting map information on the movement of the avatar, additional effects to the graphical representation, and the like. In this case, it may be inconvenient to receive an image of tracking the movement of the person again from an imaging device and generating the changed prototype. Even when the execution terminal 200 executes the changed prototype, it may also be necessary to receive a trigger input again from the imaging device.

In this case, the prototyping terminal 100 may transmit the message recorded in the execution terminal 200 as described above.

The execution terminal 200 may sense a trigger on the basis of the received message, thereby outputting a response of the changed prototype.

Figure 7:
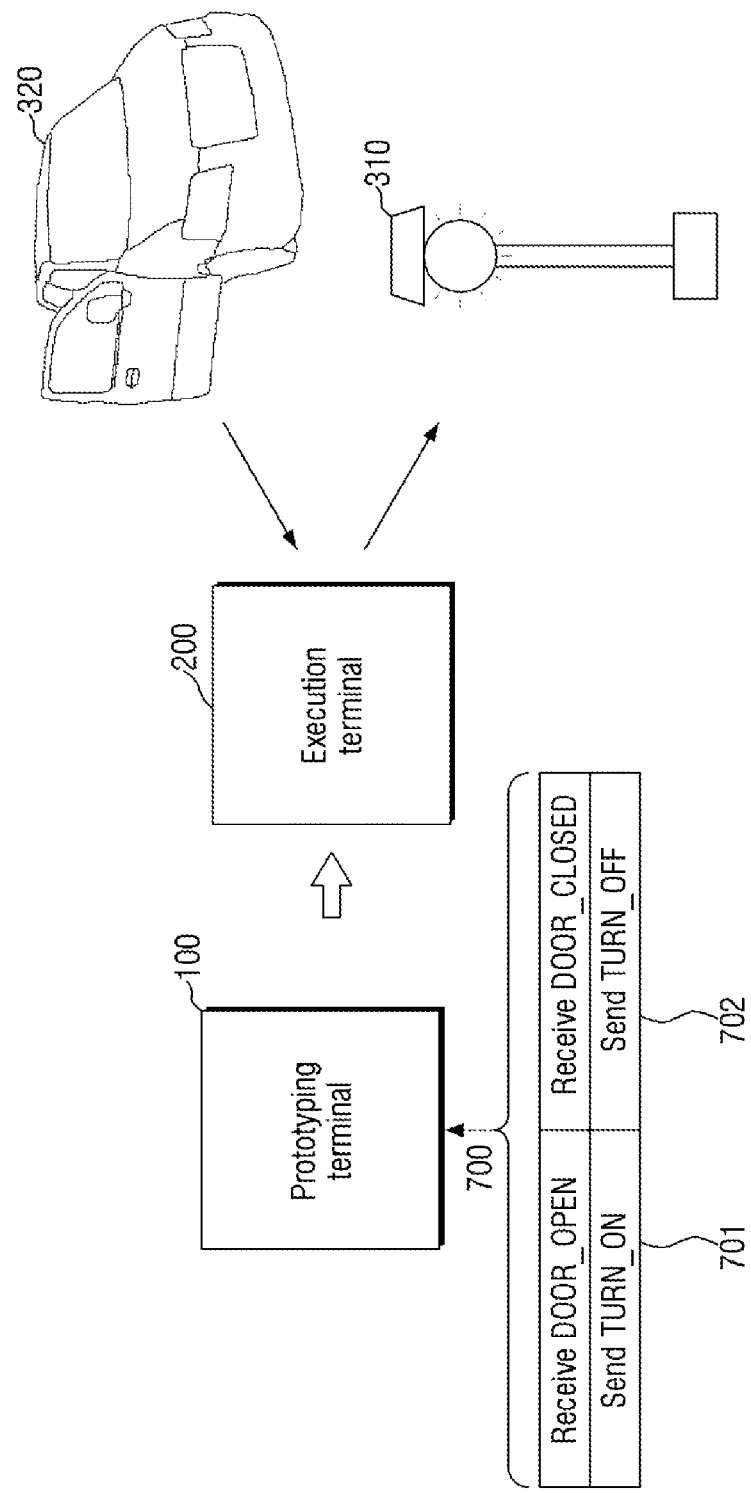
FIG. 7 illustrates an example of a prototype which outputs a response of another external terminal when a trigger input is received from one external terminal, referred to by some embodiments of the present inventive concept.

FIG. 7 illustrates an example of a prototype which outputs a response of another external terminal when a trigger input is received from one external terminal, referred to by some embodiments of the present inventive concept. A plurality of external terminals are shown in FIG. 7. The external terminals may be referred respectively to as a first external terminal and a second external terminal. The car 320 is illustrated as an example of the first external terminal, and the lamp 310 is illustrated as an example of the second external terminal.

Referring to FIG. 7, the prototyping terminal 100 may generate a prototype on the basis of a trigger and setups for a response. For example, it is assumed that a prototype 700 is generated by the prototyping terminal 100.

To generate the prototype 700, a trigger input of the first external terminal 320 may be set as a trigger in the prototyping terminal 100. Specifically, when the trigger input of the first external terminal 320 is received by a bridge application pre-matched to the first external terminal (hereinafter, referred to as bridge application 1), bridge application 1 may generate, from the trigger input, a message including an identifier for identifying the first external terminal 320 matched to bridge application 1. The generated message may be transmitted from bridge application 1 to the prototype execution software 205. The execution terminal 200 may identify the message and sense the message as a trigger. As described, receiving, by the execution terminal 200, the message generated by bridge application 1 may be set as a trigger in the prototyping terminal 100.

The prototype 700 may be divided into two functional areas according to the type of the trigger. The prototype 700 may be divided into two areas 701 and 702 of a trigger of receiving a message DOOR_OPEN indicating opening of a door of the car 320 and a trigger of receiving a message DOOR_CLOSED indicating closing of the door of the car 320, respectively. Furthermore, a response of the second external terminal 310 according to the set trigger may be set in the prototyping terminal 100.

Referring to the prototype 700, activating (turn on) the second external terminal 310 is set as a response in the area 701, and deactivating (turn off) the second external terminal 310 is set as a response in the area 702.

When the prototyping terminal 100 creates the prototype 700 through the creating process described above, the execution terminal 200 may receive the prototype 700.

When the execution terminal 200 receives the trigger input from the first external terminal 320, the execution terminal 200 may sense a trigger on the basis of the trigger input. That is, the execution terminal 200 may identify the message generated by the bridge application 1 on the basis of the trigger input, so as to sense the trigger. For example, in FIG. 2, the trigger input may include information on a state of the car 320 which is the first external terminal. That is, the trigger input may include state information such as a door open state or a door closed state of the car 320.

In this case, outputting a response according to the state information may be set as a response in the prototyping terminal 100 when a response of the second external terminal 310 is set in the prototyping terminal 100. For example, referring to area 701, a response of enabling the lamp 310 which is the second external terminal to be activated (turned on) and turned on may be set when the door of the car 320 is at an open state. On the contrary, referring to area 702, a response of enabling the lamp 310 to be deactivated (turned off) and turned off may be set when the door of the car 320 is at a closed state.

When the trigger is sensed, the execution terminal 200 may generate a control command corresponding to the sensed trigger. The control command may be generated on the basis of the response set in the prototype 700. That is, the control command may include a command for enabling the second external terminal 310 to output a preset response according to the control command.

The execution terminal 200 may transmit the generated control command to the second external terminal 310. Specifically, as the trigger is sensed, the execution terminal 200 may identify the second external terminal 310 which outputs a response and generate a message including an identifier for identifying the second external terminal 320. The execution terminal 200 may provide the message to the bridge application pre-matched to the second terminal 310 (hereinafter, referred to as bridge application 2). Bridge application 2 may generate a control command on the basis of the message. That is, bridge application 2 may generate a control command satisfying the standard for controlling the second external terminal.

Thus, the lamp 310 which is the second external terminal may output lamp turn on or lamp turn off as a response.

The case where a numerical value is included in a trigger input when the trigger input is received from an external terminal will hereinafter be described.

Figure 8:
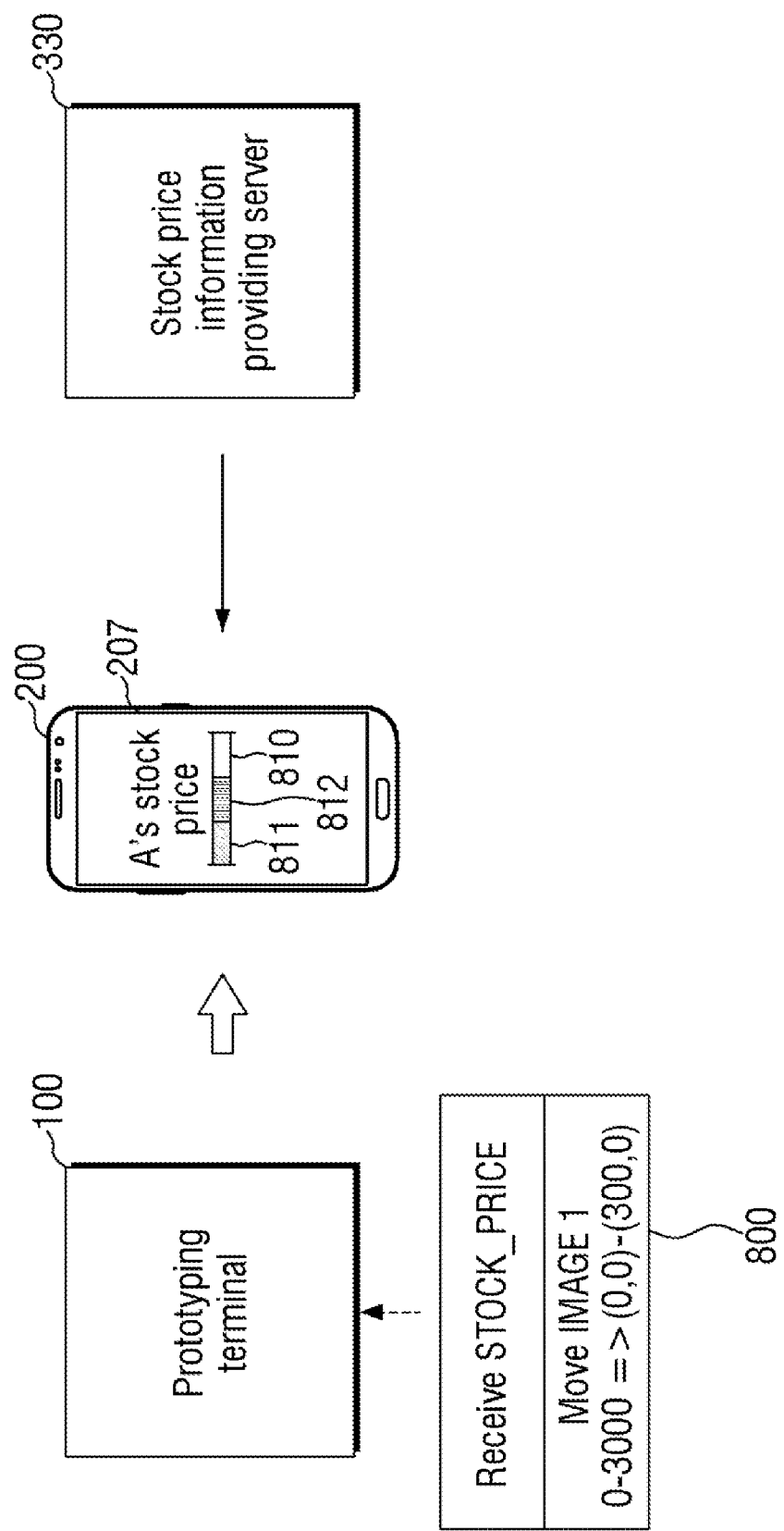
FIG. 8 illustrates an example of a prototype which generates a response of an execution terminal within a range of a specific numerical value when a numerical value is received as a trigger input from an external terminal, referred to by some embodiments of the present inventive concept.

FIG. 8 illustrates an example of a prototype which generates a response of the execution terminal 200 within a range of a specific numerical value when a numerical value is received as a trigger input from an external terminal, referred to by some embodiments of the present inventive concept. FIG. 8 illustrates the example in which an external terminal 330 is a service providing device for providing stock price information. Specifically, the external terminal 330 may be a server device performing Internet communication with the execution terminal 200.

The external terminal 330 may transmit the trigger input to the execution terminal 200, and in this case, the trigger input may include a numerical value equal to the stock price of a specific item. An embodiment described with reference to FIG. 8 may be similar to the embodiment described with reference to FIG. 6 in that the external terminal 330 transmits the trigger input to the execution terminal 200. The description duplicated with the description of FIG. 6 will hereinafter be omitted.

Referring to FIG. 8, the prototyping terminal 100 may generate a prototype 800. In this case, receiving a message including stock price information may be set as a trigger in the prototyping terminal 100, and changing a display state of an object through the display 207 of the execution terminal 200 may be set as a response in the prototyping terminal 100. In this case, receiving the message may be understood as a concept including receiving, by the execution terminal 200, the trigger input of the external terminal 330.

A process of setting a trigger and a response in the prototyping terminal 100 will hereinafter be described in detail. The prototyping terminal 100 may receive, as an input, a reference attribute of an object matched to the trigger. The prototyping terminal 100 may take, as an input, a numerical value range including a start value and an end value of the reference attribute. Furthermore, an identifier of the external terminal 330 and an identification of a numerical value may be set as a trigger in the prototyping terminal 100.

Receiving, as stock price information, a numerical value in a numerical value range of 0 to 3000, for example, may be set as a trigger in the prototype 800. In this case, the prototyping terminal 100 may be set such that image 1 (IMAGE1) which is an object 810 moves on the display 207 of the execution terminal 200. Specifically, FIG. 8 illustrates an example in which the object 810 is a graphical representation.

To this end, a movement on an x-axis coordinates direction in a graph region representing the object 810 may be set as the reference attribute of the object 810. For example, the prototyping terminal 100 may receive, as an input, a numerical value range in which a start value of the reference attribute is zero and an end value of the reference attribute is 300. Thus, the graph region representing the object 810 may move from 0 to 300.

Referring to the prototype 800 and the setup matters described above, the stock price information may have a numerical value range of 0 to 3000, and the reference attribute of the object 810 may have a numerical value range of 0 to 300.

In this case, changing a display state of the object 810 displayed on the display 207 of the execution terminal 200 on the basis of the numerical value received from the external terminal 330 may be set as a response in the prototyping terminal 100.

Referring to FIG. 8, as the execution terminal 200 senses the trigger, the display state of the object 810 changes from a first state 811 to a second state 812. For example, it is assumed that the execution terminal 200 senses the trigger as the numerical value 2000 is received as stock price information. In this case, the execution terminal 200 may not apply the numerical value 2000 directly to the numerical value range of the reference attribute of the object 810. This is because the stock price information and the numerical value range of the reference attribute of the object 810 are different from each other. Thus, the execution terminal 200 may determine an execution value of the reference attribute to be used for outputting a response. In the example described above, the execution value may be determined on the basis of a ratio between the stock price information and the numerical value range of the reference attribute of the object 810, but the embodiments of the present disclosure are not limited thereto.

Resultantly, changing a display state of the object 810 displayed on the display 207 of the execution terminal 200, on the basis of the received numerical value, in correspondence to changing the execution value of the reference attribute in the numerical value range of the reference attribute may be set as a response in the prototyping terminal 100.

The execution terminal 200 may receive the prototype 800, and sense a trigger on the basis of the received trigger input. The execution terminal 200 may generate a message including an identifier of the external terminal 330 and the numerical value on the basis of the received trigger input.

Specifically, when the execution terminal 200 receives the trigger input from the external terminal 330, the bridge application pre-matched to the external terminal 330 may generate a message on the basis of the trigger input. In this case, the bridge application may generate a message including the identifier for identifying the external terminal 330 and the numerical value in the trigger input.

When the external terminal 330 and the execution terminal 200 communicates through Internet, a process of generating the message by the bridge application may be omitted. In this case, the embodiment of FIG. 8 may be implemented even when the bridge application is not pre-stored in the execution terminal 200. This is because a message translation process is not required separately in the process of communication between the execution terminal 200 and the external terminal 330.

The execution terminal 200 may receive the message through the bridge application, and sense the trigger on the basis of the message. In the example described above, as the trigger is sensed, the execution terminal 200 may change the display state of the object 810 from the first state 811 to the second state 812 according to the set response.

Figure 9:
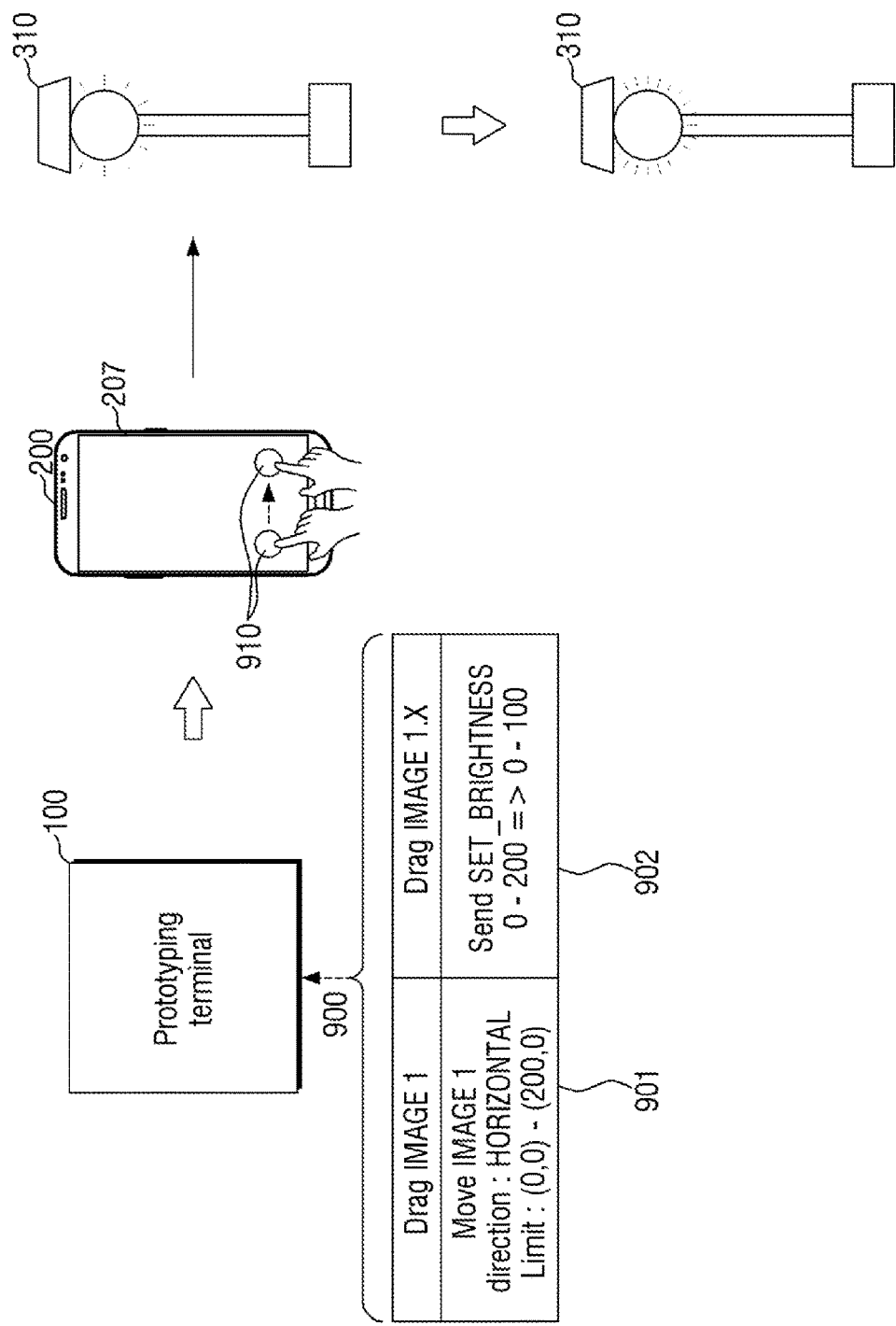
FIG. 9 illustrates an example of a prototype which outputs a response of an external terminal on the basis of a specific numerical value when a displacement of an object on an execution terminal is received as a trigger input, referred to by some embodiments of the present inventive concept.

FIG. 9 illustrates an example of a prototype which outputs a response of an external terminal on the basis of a specific numerical value when a displacement of an object on the execution terminal 200 is received as a trigger input, referred to by some embodiments of the present inventive concept.

FIG. 9 illustrates the example in which the external terminal is the lamp 310. The description duplicated with the description of FIG. 5 will hereinafter be omitted.

Receiving a drag input for an object 910 through a user input may be set as a trigger in the prototyping terminal 100 so as to generate a prototype 900. Specifically, the reference attribute of the object 910 may be set as x-axis coordinates of the object 910. Furthermore, the prototyping terminal 100 may receive, as an input, 0 to 200 as a numerical value range of the reference attribute.

Moving the display state of the object 910 on the display 207 of the execution terminal 200 in a horizontal direction (901) may be set as a response in the prototyping terminal 100. Furthermore, outputting a response of the lamp 310 (902) when moving the object 910 in a horizontal direction may be set in the prototyping terminal 100 as a response to be output in the execution terminal 200

In other words, a response output of the execution terminal 200 may be generated with a drag input which is a user input, as a first trigger, and a response output of the lamp 310 may be generated with the response output of the execution terminal 200, as a second trigger. In this case, the terms "first trigger" and "second trigger" are used so as to identify the order of trigger generation.

Specifically, referring to FIG. 9, a response may be set in the prototyping terminal 100 such that the response output of the lamp 310 changes according to the degree of the movement of the object 910 in x-axis direction within the numerical value range according to the reference attribute of the object 910.

For example, a response may be set in the prototype 900 such that the brightness of the lamp 310 may be controlled according to the degree of the movement of the object 910.

In this case, the brightness of the lamp 310 may have a numerical value range different from the numerical value range of the reference attribute. In this case, the execution terminal 200 may determine an execution value on the basis of the degree of the movement of the object 910 in x-axis direction. The execution value may be a numerical value applied to the numerical value range of the brightness so as to determine the level of the response to be output.

The execution terminal 200 may generate a message including an identifier for identifying the lamp 310 on the basis of the determined execution value, and provide the message to a bridge application. The bridge application may be pre-matched to the lamp 310.

The bridge application may generate a control command on the basis of the message, and transmit the control command to the lamp 310. The control command may include brightness control information of the lamp 310 corresponding to the execution value.

The lamp 310 may output a response for controlling the brightness on the basis of the brightness control information.

Figure 10:
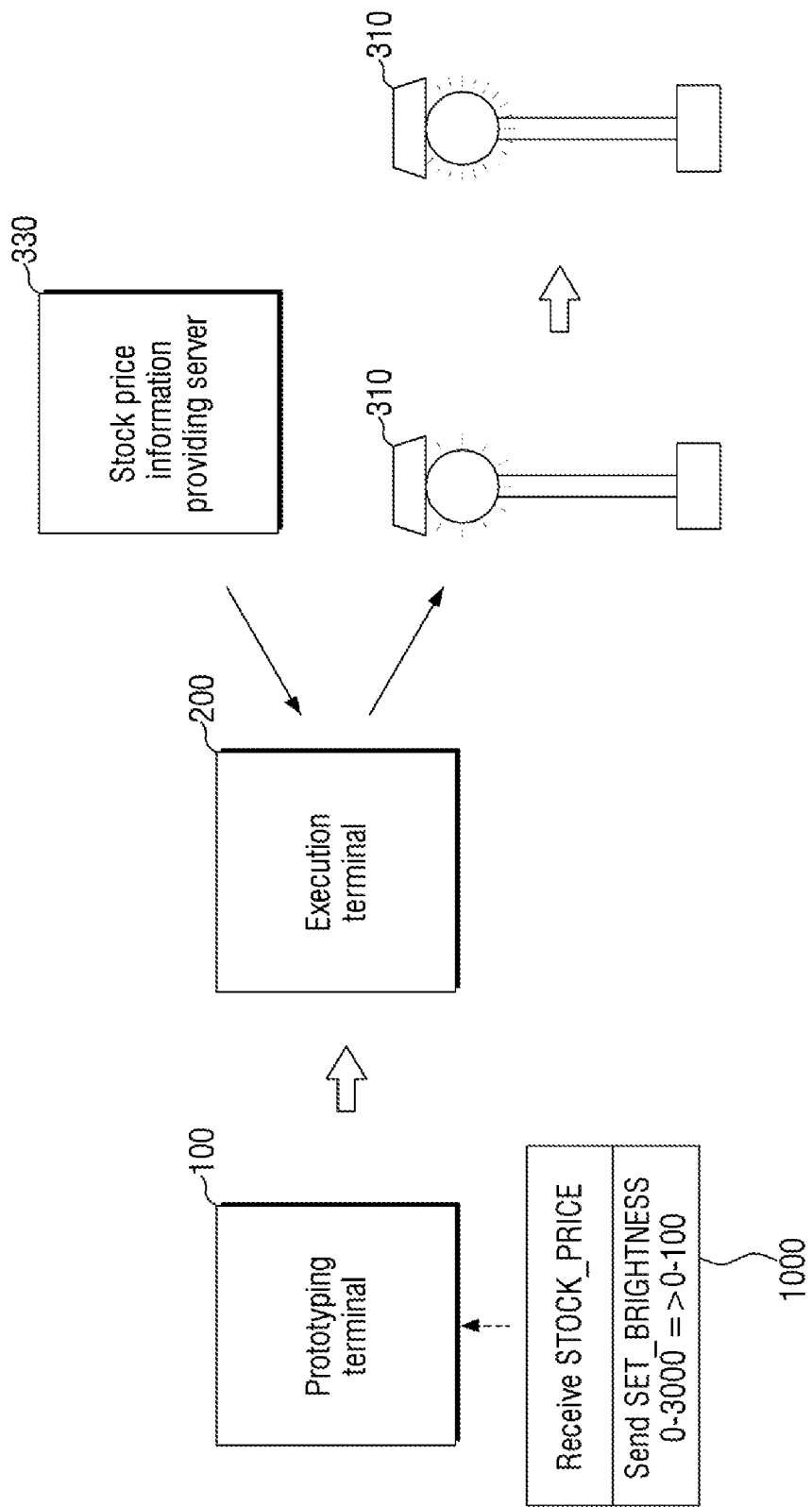
FIG. 10 illustrates an example of a prototype which outputs a response of another external terminal on the basis of a specific numerical value when a numerical value is received as a trigger input from one external terminal, referred to by some embodiments of the present inventive concept.

FIG. 10 illustrates an example of a prototype which outputs a response of another external terminal on the basis of a specific numerical value when a numerical value is received as a trigger input from one external terminal, referred to by some embodiments of the present inventive concept. FIG. 10 illustrates the example in which a stock price information providing server 330 is a first external terminal, and the lamp 310 is a second external terminal. An embodiment described with reference to FIG. 10 may be similar to the embodiment described with reference to FIG. 7 in that the second external terminal 310 outputs a response when a trigger input is received from the first external terminal 330. The description duplicated with the description of FIG. 7 will hereinafter be omitted.

Referring to FIG. 10, like the trigger described with reference to FIG. 8, receiving a numerical value in the numerical value range of 0 to 3000 from the first external terminal 330 may be set as a trigger in the prototyping terminal 100. Furthermore, a response for controlling the brightness of the lamp 310 which is the second external terminal according to the reception of the stock price information within the numerical value range of 0 to 3000 may be set in the prototyping terminal 100. Specifically, the prototyping terminal 100 may receive, as an input, the numerical value range indicating the brightness, and controlling the brightness of the lamp 310 on the basis of the response execution value of the lamp 310 may be set as a response in the prototyping terminal 100. The response execution value may be determined on the basis of the numerical value received from the first external terminal 330. In the example described above, the numerical value range of the numerical value received from the first external terminal 330 may be different from the numerical value range related to the response of the second external terminal 310. That is, the numerical value range of the numerical value received from the first external terminal 330 may be 0 to 3000, and the numerical value range related to the response of the second external terminal 310 may be 0 to 100.

For example, when the received stock price information is 1500, the execution terminal 200 may determine the response execution value as 50.

It is assumed that the execution terminal 200 receives a prototype 1000, and receives a trigger input from the first external terminal 330.

The execution terminal 200 may generate a first message including an identifier of the external terminal 330 and the numerical value on the basis of the received trigger input. Furthermore, the execution terminal 200 may sense a trigger on the basis of the generated first message. Specifically, when the trigger input is received, bridge application 1 pre-matched to the first external terminal 330 may generate a first message including the identifier for identifying the first external terminal 330 on the basis of the received trigger input. When bridge application 1 provides the first message to the execution terminal 200, the execution terminal 200 may sense the trigger.

The execution terminal 200 may generate a control command corresponding to the sensed trigger.

Specifically, the execution terminal 200 may generate a second message including an identifier for identifying the second external terminal 310. The generated second message may be provided to bridge application 2 pre-matched to the second external terminal 310. Bridge application 2 may generate a control command on the basis of the second message, and transmit the control command to the second external terminal 310.

Referring to FIG. 10, the second external terminal 310 may output a response for controlling brightness according to the control command.

In the examples thus far described, the execution terminal 200 may be provided with the bridge application such that the external terminal may transmit the control command to the actual execution terminal 200. However, unlike those described above, a prototype execution environment may not be provided with an external terminal or a bridge application. A method for creating a prototype when the prototype execution environment is not provided with an external terminal or a bridge application will now be described.

When a prototype creation input is received from a user, the prototyping terminal 100 may generate a prototype, and the execution terminal 200 may receive the generated prototype. In this case, since an external terminal or a bridge application is not provided, the prototyping terminal 100 may transmit a trigger input of an external terminal in place of the external terminal, thereby improving convenience of creation and execution of the prototype.

According to the embodiment described above with reference to FIG. 6, when the execution terminal 200 receives the trigger input of the external terminal 320, the bridge application generates a message, and transmits the message to the execution terminal. However, when the external terminal 320 and/or a bridge application is not provided, the prototyping terminal 100 may virtually transmit a trigger input of the external terminal (hereinafter, referred to as a virtual trigger input).

In this case, when the prototyping terminal 100 and the execution terminal 200 communicates through Internet, or when the prototyping terminal 100 and the execution terminal 200 are homogeneous terminals, the prototyping terminal 100 may transmit the virtual trigger input in the format same as that of the message provided by a bridge application.

When the virtual trigger input is received as described above, the execution terminal 200 may sense a trigger of the received prototype. Thus, the execution terminal 200 may generate a control command corresponding to the sensed trigger.

The execution terminal 200 may output a preset response according to the generated control command. For example, when the external device 320 and the bridge pre-matched thereto described in the embodiment of FIG. 6 are not provided, the execution terminal 200 may receive a message from the prototyping terminal 100 and display the object 610.

What is claimed is:

1. A method for creating a prototype, comprising:
   receiving, by a prototyping terminal, inputs of setting a trigger of a prototype and a response of an external terminal according to the trigger;
   generating, by the prototyping terminal, a prototype based on the inputs of setting;
   receiving, by an execution terminal, the generated prototype;
   sensing, by the execution terminal, the trigger on the received prototype;
   generating, by the execution terminal, a message comprising an identifier for identifying the external terminal according to the sensing of the trigger; and
   determining, by the execution terminal, when a first message and a second message of a plurality of generated messages are generated sequentially before an expiry of a preset message transmission time, the second message representing a transmission message;
   providing, by the execution terminal, to a bridge application of pre-stored bridge applications, which is matched to the identifier, the generated message, after the expiry of the preset message transmission time;
   generating, by the execution terminal, a control command based on the generated message, using the bridge application;
   transmitting, by the execution terminal, the generated control command to the external terminal,
   wherein the control command comprises a command for enabling the external terminal to output a preset response in response to the control command.

2. The method of claim 1, wherein the sensing the trigger on the received prototype comprises receiving, from a user of the execution terminal, a user input for an object on a display of the execution terminal, and sensing the trigger of the received prototype in response to the user input.

3. The method of claim 2, wherein the receiving inputs of setting comprises setting, as the trigger, receiving the user input on the execution terminal, and setting, as the response, the preset response is output on the external terminal.

4. The method of claim 2, wherein the receiving inputs of setting comprises receiving a reference attribute of the object, receiving a numerical value range including a start value and an end value of the reference attribute, setting, as the trigger, changing a numerical value of the reference attribute within the numerical value range, and when the numerical value changes by the user input, setting, as the response, outputting the preset response from the external terminal on the basis of the change in the numerical value in response to the control command.

5. The method of claim 1, wherein the generating a message comprises determining whether a preset message transmission time has elapsed, and
   wherein the transmitting the generated control command to the external terminal comprises deferring a transmission of the control command until the preset message transmission time elapses when the preset message transmission time has not elapsed.

6. The method of claim 1, wherein the generating a message comprises transmitting, by the execution terminal, the generated message to the prototyping terminal, and when the message transmitted from the execution terminal is received, displaying, by the prototyping terminal, the received message through a display of the prototyping terminal.

7. A method for creating a prototype, comprising:
   setting, in a prototyping terminal, a trigger input of an external terminal as a trigger of a prototype;
   setting, in the prototyping terminal, a response of an execution terminal according to the trigger;
   generating, by the prototyping terminal, a prototype based on the setting of the trigger and the response;
   receiving, by the execution terminal, the generated prototype;
   receiving, by the execution terminal, a trigger input from the external terminal;
   generating, by the execution terminal, a message comprising an identifier for identifying the external terminal based on the received trigger input, using a bridge application;
   determining, by the execution terminal, when a first message and a second message of a plurality of generated messages, are generated sequentially before an expiry of a preset message receiving time, the second message representing a receiving message;
   receiving, by the execution terminal, the generated message, from a bridge application which generated the second message, after the expiry of the preset message receiving time;
   sensing, by the execution terminal, the trigger, in response to the receiving the generated message;
   outputting, by the execution terminal, a preset response when the trigger is sensed.

8. The method of claim 7, wherein the trigger input comprises state information of the external terminal, and
   the setting a response comprises setting, as the response, displaying an object matched to the sensed trigger on a display of the execution terminal according to the state information.

9. The method of claim 7, wherein the generating, by the execution terminal, a message comprising an identifier for identifying the external terminal based on the received trigger input, using a bridge application comprises generating the message including an identifier of the external terminal and a numerical value based on the received trigger input, and sensing the trigger on the basis of the message, and
   wherein the setting a trigger input of an external terminal as a trigger of a prototype comprises receiving, by the prototyping terminal, a reference attribute of an object matched to the sensed trigger, receiving a numerical value range including a start value and an end value of the reference attribute, and setting, as the trigger, the identifier of the external terminal and an identification of the numerical value.

10. The method of claim 9, wherein the setting a response comprises setting, as the response, changing a display state of an object displayed on a display of the execution terminal, based on a numerical value in the message, in correspondence to changing an execution value of the reference attribute within the numerical value range, and
wherein the outputting a response comprises changing, by the execution terminal, the display state of the object according to the preset response.

11. The method of claim 7, wherein the generating, by the execution terminal, a message comprising an identifier for identifying the external terminal based on the received trigger input, using a bridge application comprises generating, by the execution terminal, a message on the basis of the received trigger input, transmitting, by the execution terminal, the generated message to the prototyping terminal, and when the message transmitted from the execution terminal is received, displaying, by the prototyping terminal, the received message through a display of the prototyping terminal.

12. The method of claim 11, wherein the displaying, by the prototyping terminal, the received message through a display of the prototyping terminal comprises recording, by the prototyping terminal, the received message, and
wherein the sensing, by the execution terminal, the trigger in response to the receiving the generated message comprises receiving, by the execution terminal, the recorded message from the prototyping terminal, and sensing the trigger as the recorded message is received.

13. A method for creating a prototype, comprising:
setting, in a prototyping terminal, a trigger input of a first external terminal as a trigger of a prototype;
setting, in the prototyping terminal, a response of a second external terminal according to the trigger;
generating, by the prototyping terminal, a prototype based on the setting of trigger and the response;
receiving, by an execution terminal, the generated prototype;
receiving, by the execution terminal, a trigger input from the first external terminal;
generating, by the execution terminal, a first message comprising an identifier for identifying the first external terminal based on the received trigger input, using a first bridge application of a plurality of bridge applications pre-stored on the execution terminal;
receiving, by the execution terminal, the generated first message, from the first bridge application;
sensing, by the execution terminal, the trigger, in response to the receiving the generated first message;
according to the sensing of the trigger, generating, by the execution terminal, a second message comprising a second identifier for identifying the second external terminal;
providing, by the execution terminal, to a second bridge application which is matched to the second identifier, the generated second message;
generating, by the execution terminal, using the second bridge application, a control command based on the generated second message; and
transmitting, by the execution terminal, the generated control command to the second external terminal,
wherein the control command comprises a command for enabling the second external terminal to output a preset response in response to the control command.

14. The method of claim 13, wherein the trigger input comprises state information of the first external terminal,
and the setting a response comprises setting, as the response, outputting, by the second external terminal, the preset response based on the state information.

15. The method of claim 13, wherein the generated first message further comprises a numerical value.

16. The method of claim 13, wherein the setting a trigger input of a first external terminal as a trigger of a prototype comprises setting, as the trigger, identifying an identifier of the first external terminal and a numerical value based on the trigger input,
wherein the setting a response of a second external terminal comprises receiving, by the prototyping terminal, a numerical value range related to the response of the second external terminal, and setting, as the response, outputting the response of the second external terminal based on a response execution value of the second external terminal within the numerical value range, and
wherein the response execution value is determined based on the numerical value.

17. A prototype execution terminal comprising:
one or more processors;
a memory which loads a computer program executed by the processors; and
a storage which stores the computer program, a prototype received from a prototyping terminal, and a bridge application,
wherein the computer program comprises:
an operation for sensing a trigger of the prototype;
an operation for generating a message comprising an identifier for identifying an external terminal when the trigger is sensed;
an operation for determining, when a first message and a second message of a plurality of generated messages are generated sequentially before an expiry of a preset message transmission time, the second message representing a transmission message;
an operation for providing, to a bridge application of pre-stored bridge applications, which is matched to the identifier, the generated message, after the expiry of the preset message transmission time;
an operation for generating a control command based on the generated message, using the bridge application; and
an operation for transmitting the control command to an external terminal matched to the bridge application,
wherein the control command includes a command for enabling the external terminal to output a preset response.

18. A prototype execution terminal comprising:
one or more processors;
a memory which loads a computer program executed by the processors;
a storage which stores the computer program, a prototype received from a prototyping terminal, and a bridge application; and
a display which displays an object,
wherein the computer program comprises:
an operation of receiving a trigger input from an external terminal;
an operation of generating a message comprising an identifier for identifying the external terminal by using the bridge application on the basis of the trigger input;
an operation of determining, when a first message and a second message of a plurality of generated messages are generated sequentially before an expiry of a preset message transmission time, the second message representing a transmission message;
an operation of receiving the generated message, from a bridge application which generated the second message, after the expiry of the preset message transmission time;
an operation of sensing the trigger of the prototype, in response to the receiving the generated message;
an operation of generating a control command corresponding to the sensed trigger, when the trigger is sensed; and
an operation of changing a display state of the object according to the control command.

* * * * *